US011226800B2

(12) United States Patent
Shah

(10) Patent No.: US 11,226,800 B2
(45) Date of Patent: *Jan. 18, 2022

(54) CROSS-PLATFORM NATIVE PERSONALIZED EXPERIENCES

(71) Applicant: Microsoft Technology Licensing, LLC, Redmond, WA (US)

(72) Inventor: Shrey Nitin Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/079,983

(22) Filed: Oct. 26, 2020

(65) Prior Publication Data

US 2021/0042101 A1 Feb. 11, 2021

Related U.S. Application Data

(63) Continuation of application No. 16/241,214, filed on Jan. 7, 2019, now Pat. No. 10,853,045.

(51) Int. Cl.

| G06F 8/41 | (2018.01) |
| G06F 16/178 | (2019.01) |
| G06F 16/11 | (2019.01) |
| G06F 8/61 | (2018.01) |
| H04L 29/08 | (2006.01) |

(52) U.S. Cl.
CPC .............. G06F 8/447 (2013.01); G06F 8/61 (2013.01); G06F 16/116 (2019.01); G06F 16/178 (2019.01); H04L 67/34 (2013.01)

(58) Field of Classification Search
CPC .......... G06F 8/447; G06F 8/61; G06F 16/116; G06F 16/178; G06F 9/4451; H04L 41/0813; H04L 41/0846; H04L 67/306
See application file for complete search history.

(56) References Cited

U.S. PATENT DOCUMENTS

2017/0185421 A1* 6/2017 Ketola ................... G06F 9/451

OTHER PUBLICATIONS

Chao Li et al., A Mapping-Based Sharing Approach for Heterogeneous XML Data Supporting User Personalization, IEEE, vol. 7 , 2019, retrieved online on Sep. 10, 2021, p. 76789-76805. Retrieved from the Internet: <URL: https://ieeexplore.IEEE.org/stamp/stamp.jsp?tp=&arnumber=8735695>. (Year: 2019).*

* cited by examiner

*Primary Examiner* — Hanh Thi-Minh Bui

(57) ABSTRACT

In non-limiting examples of the present disclosure, systems, methods and devices for providing a consistent cross-platform experience are provided. A mapping component for mapping a plurality of personalized user experience elements for a plurality of computing devices may be maintained, wherein each of the plurality of computing devices operates on a separate platform. A determination may be made by a first on of the plurality of computing devices that one of the plurality of personalized user experience elements on a second one of the plurality of devices has been modified. A personalized user experience element on the first one of the plurality of computing devices corresponding to the modification to the modified personalized user experience element on the second one of the plurality of computing devise may be modified.

20 Claims, 9 Drawing Sheets

CROSS-PLATFORM NATIVE PERSONALIZED EXPERIENCES

RELATED APPLICATION

This application is a continuation of and claims priority to U.S. patent application Ser. No. 16/241,214, entitled "Cross-Platform Native Personalized Experiences" and filed Jan. 7, 2019, the disclosure of which is hereby incorporated by reference in its entirety.

BACKGROUND

Computing devices have become ubiquitous in most aspects of life. It is now common for users to be connected to at least one device at any given time, and sometimes even two or three devices at once. One of the reasons that computing devices have become so ubiquitous to everyday users is due to the number of options available to those users. For any given device type (e.g., phone, tablet, laptop, desktop) there are multiple device manufacturers with their own set of hardware configurations, in addition to unique operating system types and application suites that may be run on those devices. Thus, it is not uncommon for a user to have, and frequently use, a smart phone that operates on a first platform, a tablet that operates on a second platform, and one or more desktop and/or laptop computing devices that operate on one or more additional platforms.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for providing a consistent cross-platform experience across multiple devices. According to examples, a user may associate a plurality of computing devices that operate on a plurality of different platforms with one another. One or more of the devices may maintain a mapping component for mapping user experience elements from one or more of the devices to one or more other ones of the devices. In some examples, a cross-platform transformation service may assist with mapping these elements from one device to another. In examples, when a user experience customization has been made to one of the devices, the mapping component may determine whether a one-to-one mapping can be made between that device and one or more other devices (e.g., modify a background of multiple devices, modify an application setting on multiple devices). If a one-to-one mapping can be made, the customization/modification may be made on one or more corresponding devices. In some examples, a translation engine may translate the modification from the device that the original customization occurred such that the corresponding devices may make the modification. In additional examples, if a one-to-one mapping cannot be made, the customization/modification may be modified based on one or more rules such that the modification can be customized in a similar manner on one or more corresponding devices.

BRIEF DESCRIPTION OF THE DRAWINGS

Non-limiting and non-exhaustive examples are described with reference to the following figures.

DETAILED DESCRIPTION

Figure 1:
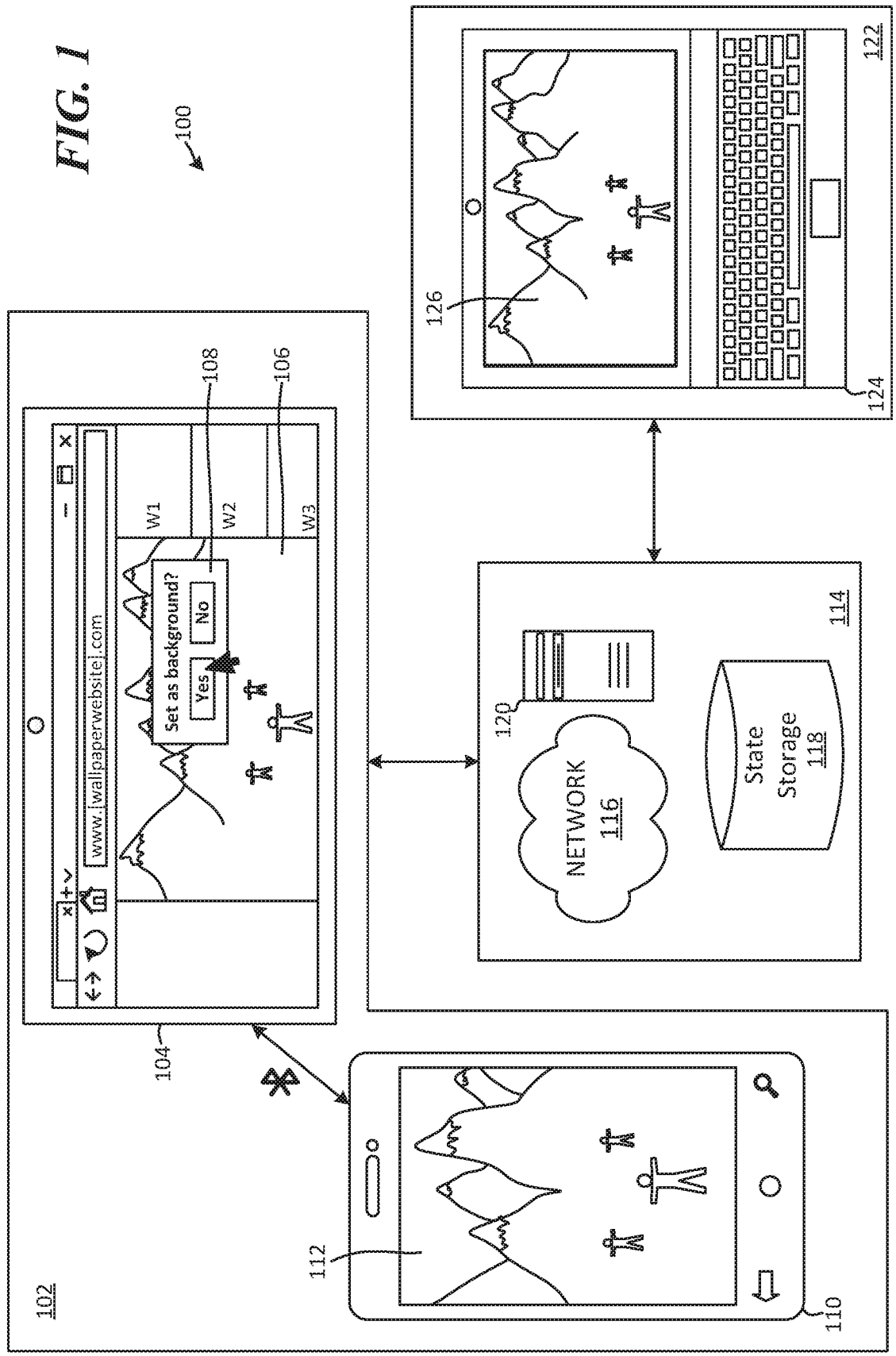
FIG. 1 is a schematic diagram illustrating an example distributed computing environment for providing a consistent cross-platform experience by mapping a desktop background modification made at a first device, to corresponding user experience elements on second and third devices.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for providing a consistent cross-platform experience across devices. As used herein, "platform" describes a specific environment comprised of a set of computer hardware and an operating system on which software is executed. For example, a first computing device may be said to run on a first platform that is different than a second platform if it has a unique set of one or both of: hardware components and/or an operating system (including an operating system version), and a second computing device may be said to run on a second platform that is different from the first platform if it has a set of one or both of: hardware components and/or an operating system (including an operating system version), that is different than the first computing device. The examples described herein provide a model in which platform native personalization/customization constructs can be mapped and applied across platform boundaries. This enables continuity of experiences and personalization of settings without regard of the underlying platform or application in which those experiences originated. Settings such as wallpapers, color themes, application organization, web browser settings, and other user experience settings can move between experiences on platforms including different operating systems and operating system versions, hardware setup, and applications, via mechanisms that provide for the reading/augmenting of the state of a particular element of the user experience. These mechanisms provide the ability to consume and generate a normalized representation of data. In some examples a translation engine and/or a mapping component as described herein may utilize any serialization mechanism (e.g., schematized JSON, XML, YAML) for translating user experiences between platforms.

According to examples, if a user associates a first and second device with one another (e.g., via a user account), and those devices operate on different platforms, one or more of the user experience elements and/or customizations applied on one of those devices may nonetheless be carried over to the other device. According to some examples, a mapping component operating all or in part on one or both of the devices may attempt to translate user experience modifications made to one of the devices to the other device via a direct connection. The direct connection may comprise, for example, a local area network connection, a Bluetooth connection, a QR code, etc. Thus, if on one of the devices, a modification is made to a user experience element/setting, that information may be translated and implemented in a same or similar manner on the other device based on sending state information associated with the modified device to the other device. In other examples, if a direct connection is not available, a device on which a user experience modification and/or setting has been made may upload state information associated with the device/modification to a cross-platform transformation service. Once received by the cross-platform transformations service, the state information associated with the device on which the modification occurred may be serialized and/or translated for use on the second device. That information may be pushed out to the second device, or the second device may specifically request it. In some examples, the translation of the information may occur at the second device rather than the cross-platform transformation service.

The systems, methods, and devices described herein provide technical advantages for enabling a common user experience across devices even where the platforms those devices utilize are different. A translation engine and/or cross-platform transformation service may automatically apply a set of translation rules to map user experience elements/settings from one platform and device to one or more other platforms and devices. This saves processing costs that would otherwise be necessary for a user to manually map settings and/or user experience elements from one device and/or platform to one or more other devices and platforms. The processing savings are compounded where more than one mapping occurs (e.g., there are additional devices and platforms that are mapped). Additionally, processing costs can be saved by allowing a user to customize rules for translating user experience settings/elements for each device of a plurality of associated devices. For example, a user may have one set of translation rules that apply to a first device and platform, a second set of translation rules that apply to a second device and platform, and a third set of translation rules that apply to a third device and platform.

FIG. 1 is a schematic diagram illustrating an example distributed computing environment 100 for providing a consistent cross-platform experience by mapping a desktop background modification made at a first device, to corresponding user experience elements on second and third devices. Computing environment 100 includes direct device connection sub-environment 102, independent device sub-environment 122, and network and processing sub-environment 114. Direct device connection sub-environment 102 includes desktop computing device 104, which runs on a first platform; and mobile computing device 110, which runs on a second platform. Independent device sub-environment 122 includes laptop computing device 124, which runs on a third platform. According to examples, an operating system extension, an application, and/or a remote service, may provide an infrastructure for syncing a plurality of user experience element modifications made on one computing device and platform to one or more other computing devices and platforms illustrated in FIG. 1.

In this example, desktop computing device 104 displays user interface 106 on which a user has surfaced a computer wallpaper website www.[wallpaperwebsite].com via a web browser executing on desktop computing device 104. The computer wallpaper website displayed on desktop computing device 104 includes a currently selected wallpaper on the center of user interface 106, and three thumbnail images (W1, W2, W3) of additional wallpapers that may be selected and displayed on user interface 106. In this specific example, the user decided to change the background of desktop computing device 104 to the displayed wallpaper, as indicated by the user's selection of selectable user interface element "Yes" in pop-up window 108, which states: "Set as background?" "Yes" "No".

When the user operating desktop computing device 104 initiates the modification of the current background of desktop computing device 104 to the selected wallpaper on user interface 106 via selection of the "Yes" selectable user interface element in popup window 108, a cross-platform transformation application and/or operating system extension may attempt to identify whether any additional computing devices associated with the user are within direct communication vicinity of desktop computing device 104. In examples, the ability to directly connect with one or more additional computing devices may include the ability to connect via a Bluetooth connection, a local network connection, a QR code communication and/or a point of presence connection. In this specific example, desktop computing device 104 is within Bluetooth range of mobile computing device 110, which is associated with the same user as the user operating desktop computing device 104. Once the Bluetooth connection is established between desktop computing device 104 and mobile computing device 110, a cross-platform transformation application and/or operating system extension executed on mobile computing device 110 may receive an indication from desktop computing device 104 (and a corresponding application and/or operating system extension) that a modification to a user experience element has occurred. Specifically, the notification may include an indication that the desktop background for desktop computing device 104 has been modified to the selected background from the wallpaper website shown on user interface 106. Additionally, when the cross-platform transformation application/and or operating system extension executed on desktop computing device 104 connects to mobile computing device 110, desktop computing device 104 may make a determination as to the type of platform that mobile computing device 110 runs on.

According to examples, upon forming a direct connection with mobile computing device 110, desktop computing device 104 may determine that the modification made to the background of desktop computing device 104 can be mapped to one or more user experience elements on mobile computing device 110, and desktop computing device 104 may then serialize its new wallpaper/desktop background and transfer the serialized wallpaper/desktop background to mobile computing device 110 via the Bluetooth connection. When mobile computing device 110 receives the serialized wallpaper/desktop background, its cross-platform transformation application and/or operating system extension may identify one or more user experience elements that the received wallpaper/desktop background can be mapped to. Mobile computing device 110 may then deserialize the received wallpaper/desktop background and modify the identified user experience elements to correspond to the wallpaper/desktop background. Thus, in this specific example, mobile computing device has changed its background to a reduced image size of the background selected at desktop computing device 104, as illustrated by the displayed image on user interface 112. Of note, mobile computing device 110 has performed a transformation of the original desktop background image selected at desktop computing device 104 to accommodate the smaller display size of mobile computing device 110.

When the new desktop background is selected for desktop computing device 104, it may be the case that one or more computing devices that are known to be associated with desktop computing device 104 and/or a user associated with desktop computing device 104, are not within direct connection vicinity of desktop computing device 104. Thus, rather than transferring the modified user experience information directly to those other devices, desktop computing device 104 may upload state information associated with the new desktop background to a cross-platform transformation service. For example, a cross-platform transformation service operating on one or more computing devices, such as server computing device 120 in network and processing sub-environment 114, may receive state information relating to modifications to one or more user experience elements for one or more of desktop computing device 104, mobile computing device 110 and/or laptop computing device 124. In some examples, devices associated with a user or user's account may automatically push state information for one or more user experience elements to the cross-platform transformation service periodically. In other examples, those devices may push state information for one or more user experience elements to the cross-platform transformation service when a modification has been made to one of those user experience elements. In still other examples, the cross-platform transformation service may periodically query the devices to determine whether modifications have been made to one or more user experience elements on those devices. The cross-platform transformation service may also use a push or pull model to send computing devices updates when one or more other associated devices have modified one or more user experience elements. For example, if the cross-platform transformation service receives an indication that a modification has been made to a user experience element on a first computing device, the cross-platform transformation service may automatically push that notification/information out to one or more associated devices. In other examples, if the cross-platform transformation service receives an indication that a modification has been made to a user experience element on a first computing device, the service may store that information, such as in state storage database 118, and one or more associated computing devices may query the service for that information periodically or when indicated by a user.

In this example, the cross-platform transformation service has stored the state of at least the new background that was selected at desktop computing device 104, and laptop computing device 124, which is not within direct connection range of desktop computing device 104 (or is not capable of forming a direct connection with desktop computing device 104), may query the cross-platform transformation service and receive information corresponding to the new background for desktop computing device 104, and/or the cross-platform transformation service may push that information to laptop computing device 124. In examples, one or more objects corresponding to the new background may be serialized for transfer to the platform running on laptop computing device 124, and a cross-platform transformation application and/or operating system extension may deserialize that information on laptop computing device 124 such that the background can be transformed for display on a user experience element corresponding to the background user experience element on desktop computing device 104. In this example, the new background may be transformed in this process because of one or more display properties that are different between desktop computing device 104 and laptop computing device 124, and the transformed background may be caused to take the place of laptop computing device 124's previous background, as shown on user interface 126.

Figure 2:
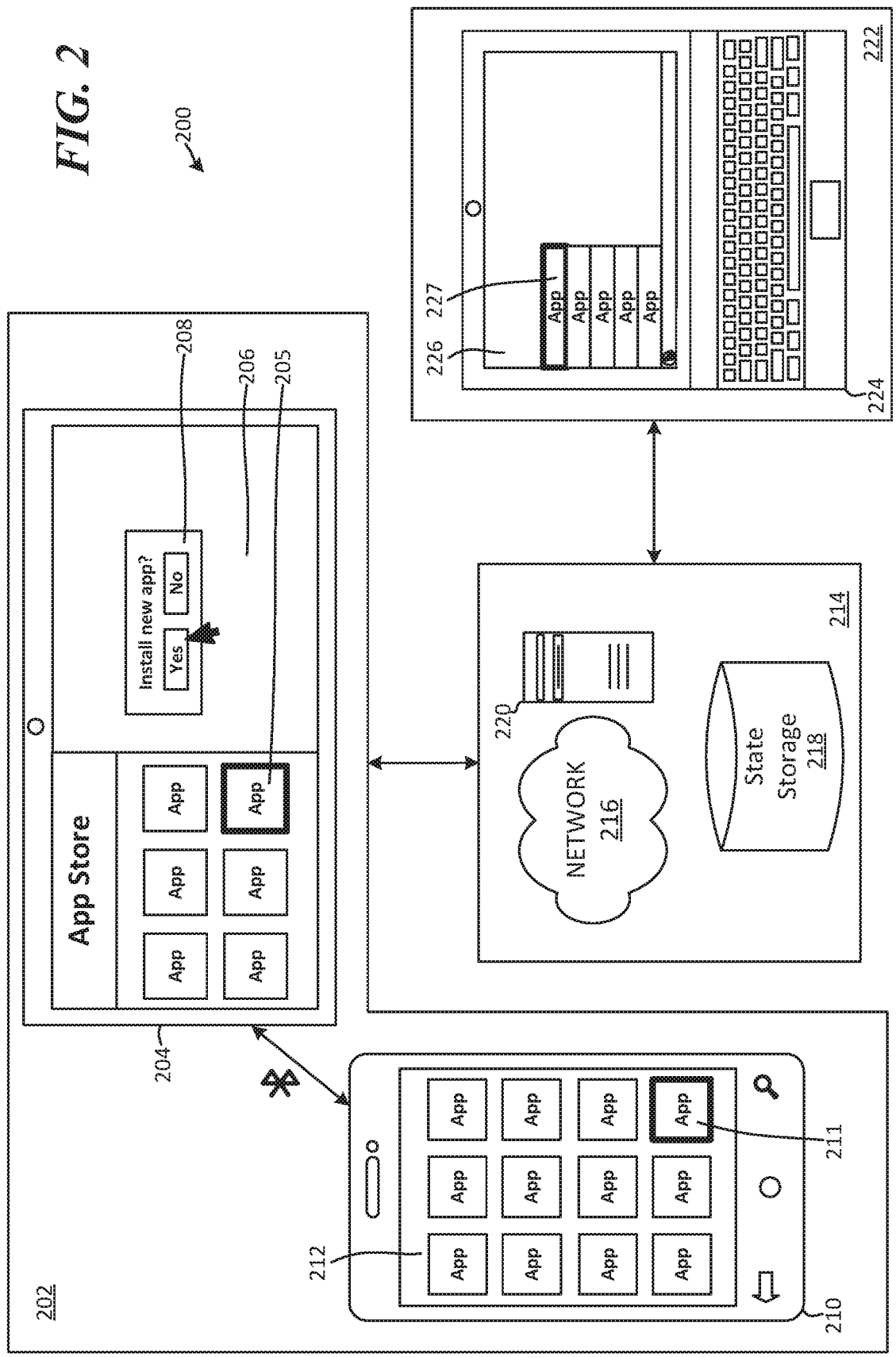
FIG. 2 is another schematic diagram illustrating an example distributed computing environment for providing a consistent cross-platform experience by mapping a new application installation on a first device, to corresponding elements on second and third devices.

FIG. 2 is another schematic diagram illustrating an example distributed computing environment 200 for providing a consistent cross-platform experience by mapping a new application installation on a first device, to corresponding elements on second and third devices. Computing environment 200 includes direct device connection sub-environment 202, independent device sub-environment 222, and network and processing sub-environment 214. Direct device connection sub-environment 202 includes desktop computing device 204, which runs on a first platform; and mobile computing device 210, which runs on a second platform. Independent device sub-environment 222 includes laptop computing device 224, which runs on a third platform. According to examples, an operating system extension, and application, and/or a remote service, may provide an infrastructure for syncing a plurality of user experience element modifications made on one computing device and platform to one or more other computing devices and platforms illustrated in FIG. 2.

In this example, desktop computing device 204 displays user interface 206 on which a user has accessed an app store. Specifically, the user interface displays a plurality of selectable icons corresponding to applications that a user may select for downloading onto desktop computing device 204. In this example, a user has selected application icon 205 from the app store and confirmed download of that application to desktop computing device 204 via confirmation pop-up window 208.

When the user interacting with desktop computing device 204 initiates download of the application corresponding to application icon 205, a cross-platform transformation application and/or operating system extension may attempt to identify whether any additional computing devices associated with the user are within direct communication vicinity of desktop computing device 104. In examples, the ability to directly connect with one or more additional computing devices may include the ability to connect via a Bluetooth connection, a local network connection, a QR code communication and/or a point of presence connection. In this specific example, desktop computing device 204 is within Bluetooth range of mobile computing device 210, which is associated with the same user as the user interacting with desktop computing device 204. Once the Bluetooth connection is established between desktop computing device 204 and mobile computing device 210, a cross-platform application and/or operating system extension executed on mobile computing device 210 may receive an indication from desktop computing device 204 (and a corresponding application and/or operating system extension) that a modification to a user experience element has occurred. Specifically, the notification may include an indication that a new application corresponding to application icon 205 has been downloaded and installed on desktop computing device 204, and that the display of the installed application icons on that computing device has also been modified to accommodate the newly installed application. Additionally, when the cross-platform transformation application/and/or operating system extension executed on desktop computing device 204 connects to mobile computing device 210, desktop computing device 204 may make a determination as to the type of platform that mobile computing device 210 runs on (e.g., X operating system, on Y hardware).

According to examples, upon forming a direct connection with mobile computing device 210, desktop computing device 204 may determine that the modification made to the applications of desktop computing device 204 can be mapped to one or more elements on mobile computing device 210, and desktop computing device 204 may then serialize its new application information and transfer that information to mobile computing device 210 via the Bluetooth connection. In some examples, desktop computing device 204 may be able to send the application directly to mobile computing device 210 for such that the application can be installed on mobile computing device 210. In other examples, desktop computing device may be able to send the identity and/or location of the application to mobile computing device 210 and mobile computing device 210 may then interact with an application store to download and install the corresponding mobile version of the application on mobile computing device 210. In additional examples, desktop computing device 204 may transfer information to mobile computing device 210 relating to the organization of applications on desktop computing device 204, and how that organization has been affected by the installation of the application on desktop computing device 204. For example, if a user has added the application icon or the like to a folder of other applications (e.g., entertainment folder, shopping folder, work folder, etc.) on desktop computing device 204, that information may be communicated to mobile computing device 210, such that when the corresponding mobile application is downloaded and installed on mobile computing device 210, the icon corresponding to that application can be arranged in a similar manner on that device.

When the new application is downloaded and installed on desktop computing device 204, it may be the case that one or more computing devices that are known to be associated with desktop computing device 204 and/or a user associated with desktop computing device 204, are not within direct connection vicinity of desktop computing device 204. Thus, rather than transferring the information corresponding to the new application directly to those other devices, desktop computing device 204 may upload state information associated with the application and/or the application icon's organization with the user interface, to a cross-platform transformation service. For example, a cross-platform transformation service operating on one or more computing devices, such as server computing device 120 in network and processing sub-environment 214, may receive state information relating to modifications to one or more user experience elements and/or application elements for one or more of desktop computing device 204, mobile computing device 210 and/or laptop computing device 224. In some examples, devices associated with a user or user's account may automatically push state information for one or more user experience elements to the cross-platform transformation service periodically. In other examples, those devices may push state information for one or more user experience and/or application elements to the cross-platform transformation service when a modification has been made to one or more of those user experience and/or application elements. In still other examples, the cross-platform transformation service may periodically query the devices to determine whether modifications have been made to one or more user experience and/or application elements on those devices. The cross-platform transformation service may also use a push or pull model to send computing devices updates when one or more other associated devices have modified one or more user experience and/or application elements. For example, if the cross-platform transformation service receives an indication that a modification has been made to a user experience and/or application element on a first computing device, the cross-platform transformation service may automatically push that notification/information out to one or more associated devices. In other examples, if the cross-platform transformation service receives an indication that a modification has been made to a user experience and/or application element on a first computing device, the service may store that information, such as in state storage database 218, and one or more associated computing devices may query the service for that information periodically or when indicated by a user.

In this example, the cross-platform transformation service has stored the state of at least the new application download/installation and arrangement of an icon corresponding to the new application, and laptop computing device 224, which is not within direct connection range of desktop computing device 204 (or is not capable of forming a direct connection with desktop computing device 204), may query the cross-platform transformation service and receive information corresponding to the new application (and its corresponding icon arrangement) that was downloaded and installed on desktop computing device 204, and/or the cross-platform transformation service may push that information to laptop computing device 224. In some examples, the application icons on desktop computing device 204, mobile computing device 210, and/or laptop computing device 224, may not be capable of being displayed in a same manner due to capabilities of those computing devices and/or their operating systems. For example, while desktop computing device 204 may allow for an arrangement of application icons in a toolbar (e.g., application icons being arrange by type in a row in a toolbar), mobile computing device 210 may not have an application toolbar but it may have folders that can be organized by application type. As such, as an example, if a new application corresponding to application icon 205 is downloaded, installed, and organized into an application toolbar on desktop computing device 204 based on application type, a transformation engine associated with the cross-platform transformation service may arrange the new application in a folder corresponding to the application type on mobile computing device 210. Similarly, the cross-platform transformation service may utilize a transformation engine to determine an appropriate translation of the application organization for laptop computing device 224 and arrange the new application in a fly-out window on laptop computing device 224 as shown with reference to application icon 227, rather than in an application toolbar as may be the case with desktop computing device 204.

Figure 3:
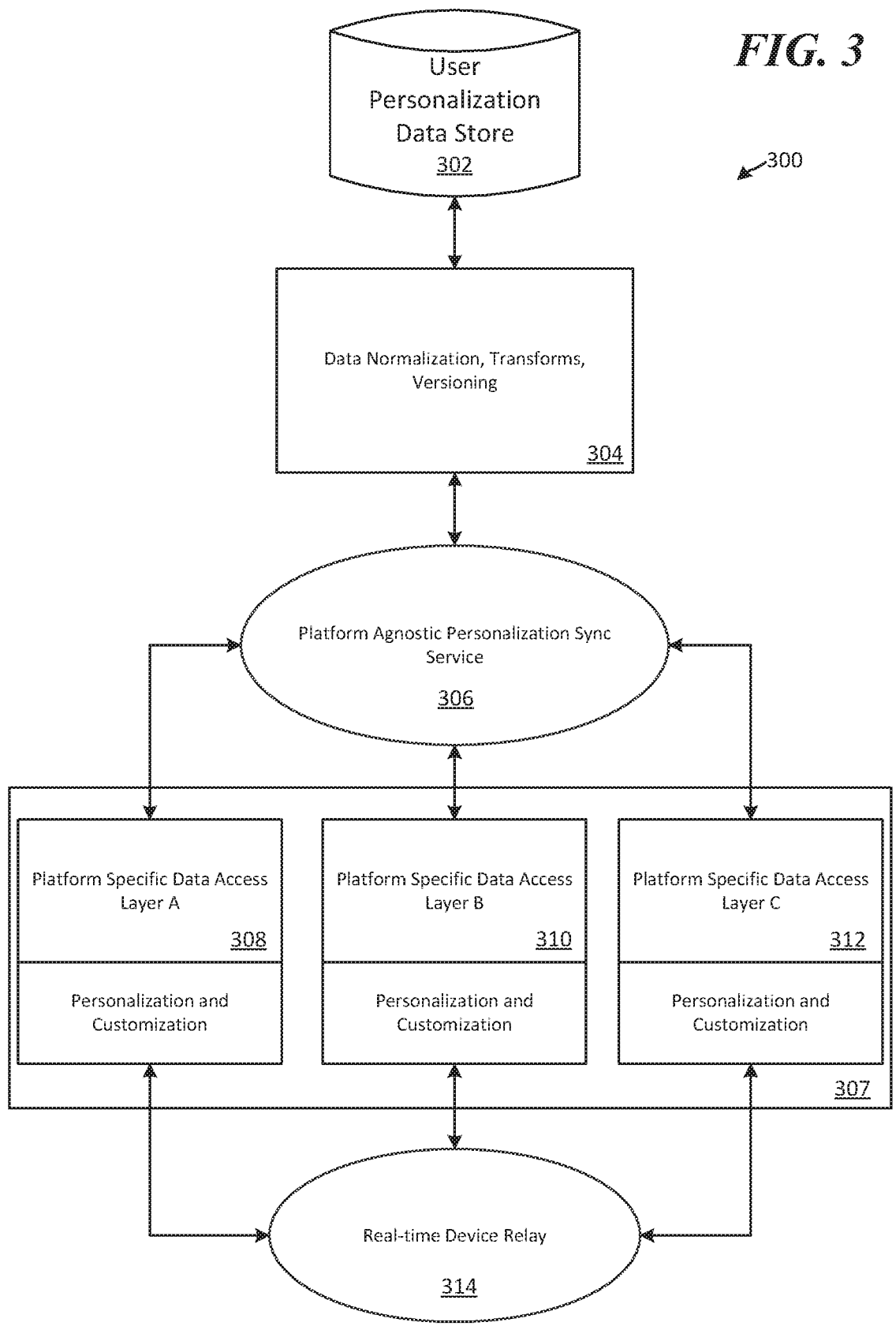
FIG. 3 illustrates various components of a distributed computing environment for providing a consistent cross-platform experience across three different platforms.

FIG. 3 illustrates various components of a distributed computing environment 300 for providing a consistent cross-platform experience across three different platforms. Computing environment 300 includes real-time device relay sub-environment 314; unique platform sub-environment 307; platform agnostic personalization sync service sub-environment 306; and data normalization, transforms, and versioning sub-environment 304.

Unique platform sub-environment 307 illustrates data access layers for three devices, each running on its own platform. Those devices correspond to platform specific data access layer A 308 with its own set of personalizations and customizations, platform specific data access layer B 310 with its own set of personalizations and customizations, and platform specific data access layer C 312 with its own set of personalizations and customizations. For example, each of the platform specific data access layers may allow the cross-platform transformation service to access some same types of data and apply some same transformation operations on that data, and each of the platform specific data access layers may have their own unique rules associated with that data. For example, a device corresponding to platform specific data access layer A 308 may allow the cross-platform transformation service to access application icon arrangement data, but it may not allow transformation service to download new applications across devices when new applications are downloaded on that platform. In other examples, a device corresponding to platform specific data access layer B 310 may allow the cross-platform transformation service to access application icon arrangement data and allow it to download new applications across devices when new applications are download on that platform.

Real-time device relay sub-environment 314 provides an infrastructure that allows endpoints (e.g., devices on unique platforms) to communicate with one another. This infrastructure provides the ability for the cross-platform transformation service to represent bundles of information corresponding to accessible device data and translate it from client to client in real-time in a point of presence model.

Platform agnostic personalization sync service sub-environment 306 allows devices that may not be able to communicate via the real-time device relay sub-environment 314, to receive the bundled data via cloud upload and communication. For example, if a first device attempts to communicate with a second device via the point of presence model, but the connection cannot be formed, the first device may upload information associated with a customization (e.g., a new background for the device, a new application download on the device, a new application icon arrangement on the device) to the cross-platform transformation service in the cloud, and the second device may access that information remotely from the cloud.

Data normalization, transforms, and versioning sub-environment 304 is a set of rules associated with one or both of the platforms and the cross-platform transformation service, which provide mechanisms for deciding conflicts between devices/platforms and settings. For example, if there are two devices that have different wallpapers, and a third device is associated with those two devices, a rule associated with data normalization, transforms, and versioning sub-environment 304 may determine which wallpaper takes precedence across one or more of the devices.

User personalization data store 302, which may be comprised all or in part on one or both of a client device and/or the cloud-based cross-platform transformation service, provides a set of user preferences associated with the cloud-based cross-platform transformation service. For example, users may define certain rules for each platform such as; "if change A is made on platform B—make change A to platform C, but not platform D", etc. In another example, a user may define rules such as, modify the state of each device to a most recently modified state. In another example, a user may define rules such as, modify the state of only certain devices to a most recently modified state.

Figure 4:
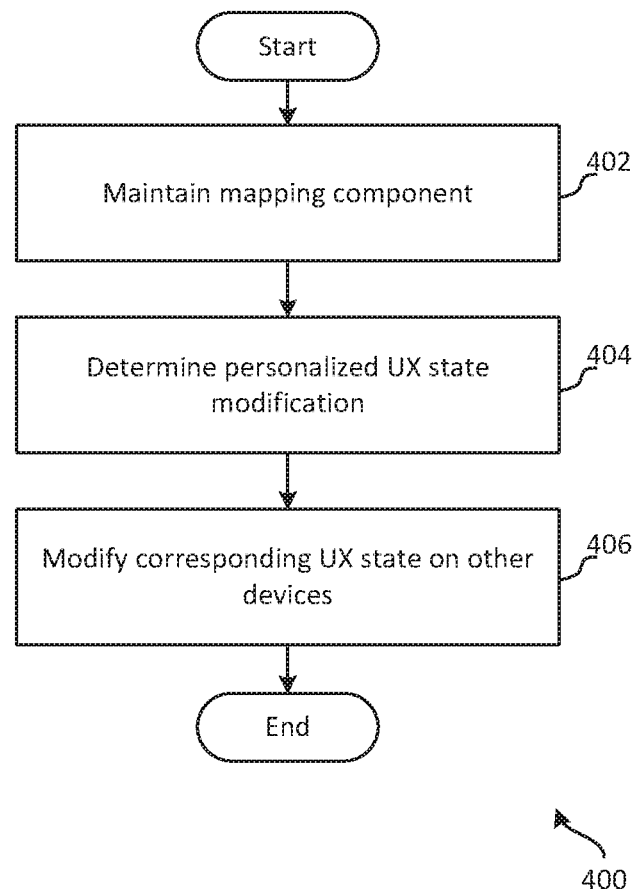
FIG. 4 illustrates an exemplary method for providing a consistent cross-platform experience across devices.

FIG. 4 illustrates an exemplary method 400 for providing a consistent cross-platform experience across devices. The method 400 begins at a start operation and flow moves to operation 402.

At operation 402 a mapping component for mapping a plurality of personalized user experience elements for a plurality of computing devices is maintained. Each of the computing devices of the plurality of computing devices may operate on a separate platform. For example, a first device may be a smart phone operating on a first operating system, a second device may be a tablet operating on a second operating system, and a third device may be a desktop computer operating on a third operating system. In some examples, the mapping component may be maintained on one or more of the computing devices. In other examples, the mapping component may be maintained in a cloud-based cross-platform transformation service. In still other examples, the mapping component may be maintained on partially on the devices and partially on the cloud service. In examples, the mapping component may comprise a plurality of rules that dictate what user experience features may be mapped from which devices and to which devices. In additional examples, the mapping component may comprise a plurality of rules that dictate in what manner one or more user experience features that may be mapped are mapped to those devices. In some examples, the mapping component may comprise a transformation engine for receiving a user experience element displayed or otherwise implemented on a first device operating on a first platform and displaying or otherwise implementing that user experience in a different but complementary way on a second device operating on a second platform.

From operation 402 flow continues too operation 404 where a determination is made by a first one of the plurality of computing devices that one of the plurality of personalized user experience elements on a second one of the plurality of computing devices has been modified. In some examples, the determination may be based a notification sent directly (e.g., local network, Bluetooth connection) from the second device to the first device. In some examples, the notification may comprise a state of one or more user experience elements of the first device. In still other examples, the determination may be based on state information for the first device uploaded to a service in the cloud. That state information may be pushed to the second device or the second device may request that information from the cloud service.

From operation 404 flow continues to operation 406 where a personalized user experience element on the first one of the plurality of computing devices corresponding to the modification to the modified personalized user experience element on the second one of the plurality of computing devices is modified. A transformation engine may be utilized in modifying the user experience element on the second device to correspond to the modification made on the first device. For example, if there is not a one-to-one mapping that may be accomplished given the first and second devices' respective platforms, one or more of the user experience properties may be modified to capture the intent of the modification on the first device. For example, transformation rules may dictate that although a background on the second device cannot be modified to reflect a modified background on the first device, the lock screen may be modified. In another example, the transformation rules may dictate that when application folder organization on the first device is modified, an application taskbar organization may be modified on the second device. Other examples are contemplated.

From operation 406 flow continues to an end operation and the method 400 ends.

Figure 5:
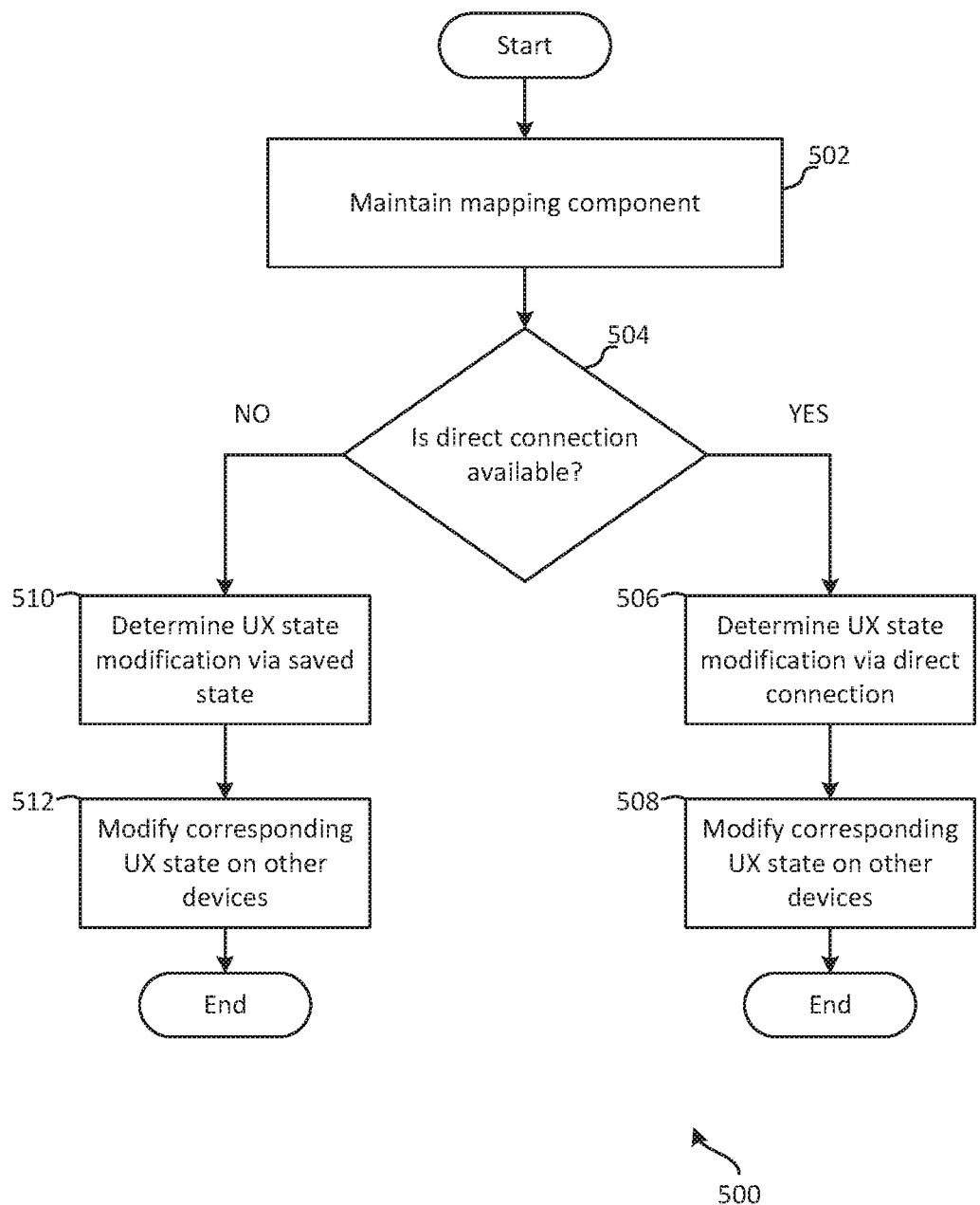
FIG. 5 is an exemplary method for providing a consistent cross-platform experience across devices that have a direct connection available to them, and across devices that do not have a direct connection available to them.

FIG. 5 is an exemplary method 500 for providing a consistent cross-platform experience across devices that have a direct connection available to them, and across devices that do not have a direct connection available to them. The method 500 begins at a start operation and flow moves to operation 502.

At operation 502 a mapping component for mapping a state of a personalized user experience of a first computing device to a state of a corresponding personalized user experience element on a second computing device is maintained. The first and second computing devices operate on separate platforms (e.g., the first computing device may be a first device type operating on a first operating system type, and the second computing device may be a second device type operating on a second operating system type).

From operation 502 flow continues to operation 504 where a determination is made as to whether a direct connection between the first computing device and the second computing device is available. For example, a determination may be made as to whether the first and second computing devices can connect via a local area connection and/or a Bluetooth connection. If at operation 504 a determination is made that a direct connection between the two devices is available, flow moves to operation 506. If at operation 504 a determination is made that a direct connection between the two devices is not available, flow moves to operation 510.

At operation 506 a determination may be made via the direct connection between the first and second computing devices that the state of the corresponding personalized user experience element on the second computing device has been modified to a current state. The current state may correspond to a modification of a previously existing user experience element (e.g., a change to a wallpaper or background, a change to application icon organization, a change to browser settings and/or bookmarks, etc.)

From operation 506 flow moves to operation 508 where the state of the personalized user experience element of the first computing device is modified to the current state as communicated by the second computing device. As discussed above, a transformation engine may be utilized in modifying the state of the first device to the current state of the second computing device. In some examples, the transformation may comprise application of one or more mapping rules and/or serialization and deserialization of the user experience modification information.

From operation 508 flow continues to an end operation and the method 500 ends.

Alternatively, where no direct connection is available, at operation 510, a determination is made via a saved state of the second computing device that the state of the corresponding personalized user experience element on the second computing device has been modified to a saved state. The state of the second computing device may be uploaded to a remote service, and that state may be accessed by the first computing device. In some examples, the state of the second computing device may be automatically pushed to the first computing device. In other examples, the state of the second computing device may be requested from the service by the first computing device.

From operation 510 flow continues to operation 512 where the state of the personalized user experience element of the first computing device is modified to the saved state of the second computing device. As discussed above, a transformation engine may be utilized in modifying the state of the first device to the current state of the second computing device. In some examples, the transformation may comprise application of one or more mapping rules and/or serialization and deserialization of the user experience modification information.

From operation 512 flow continues to an end operation and the method 500 ends.

Figure 6:
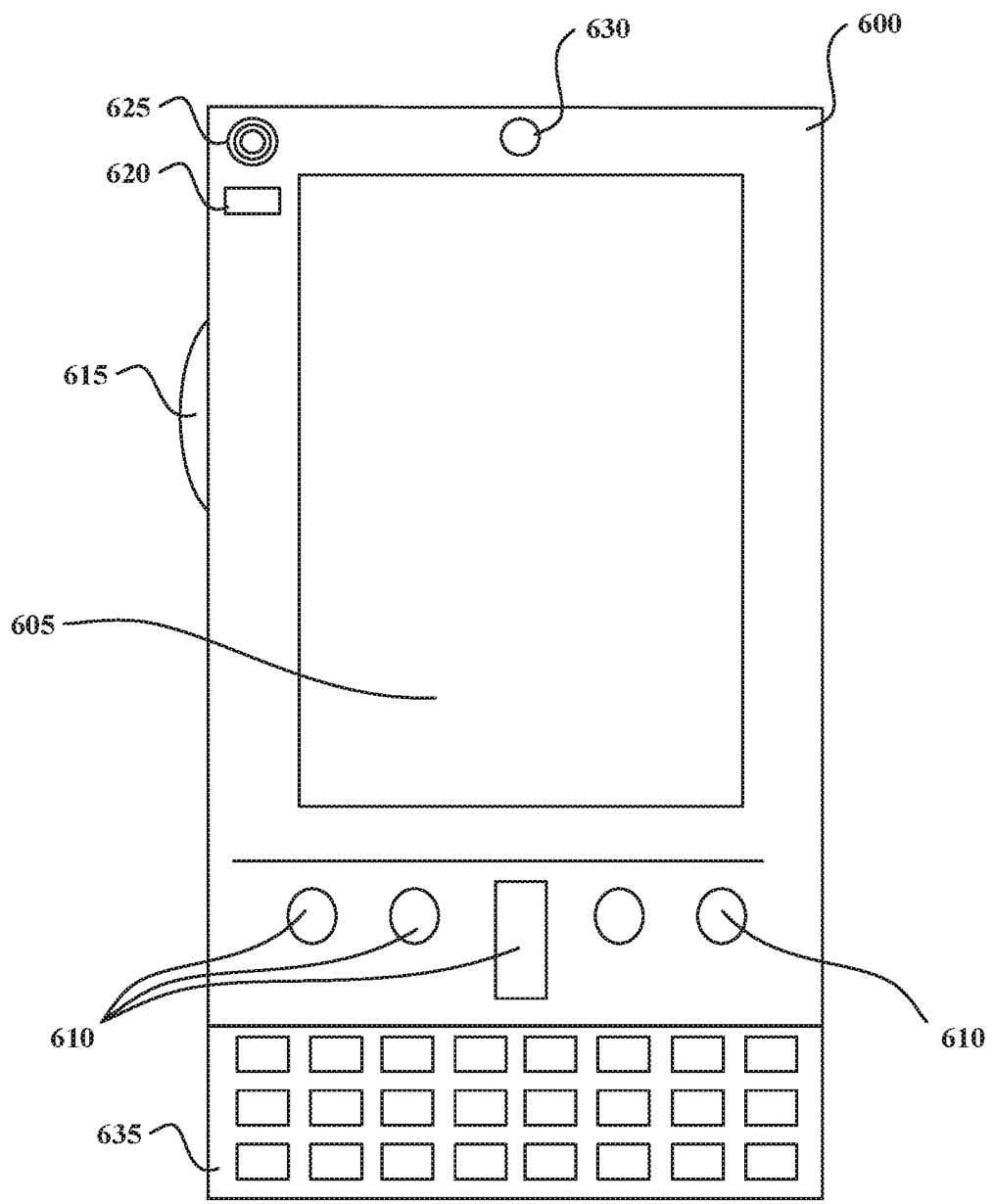
FIGS. 6 and 7 are simplified diagrams of a mobile computing device with which aspects of the disclosure may be practiced.
Figure 7:
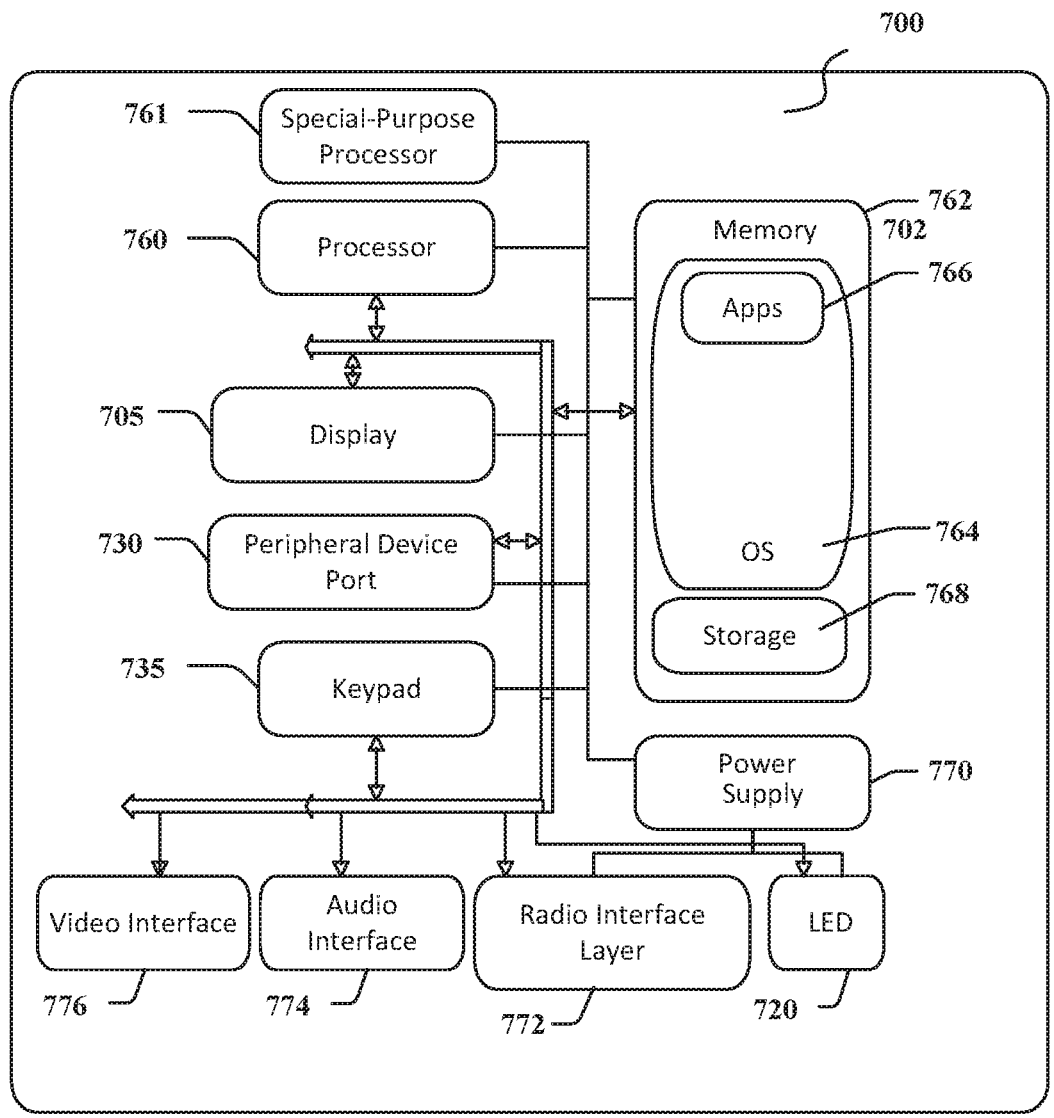

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a user experience transformation computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
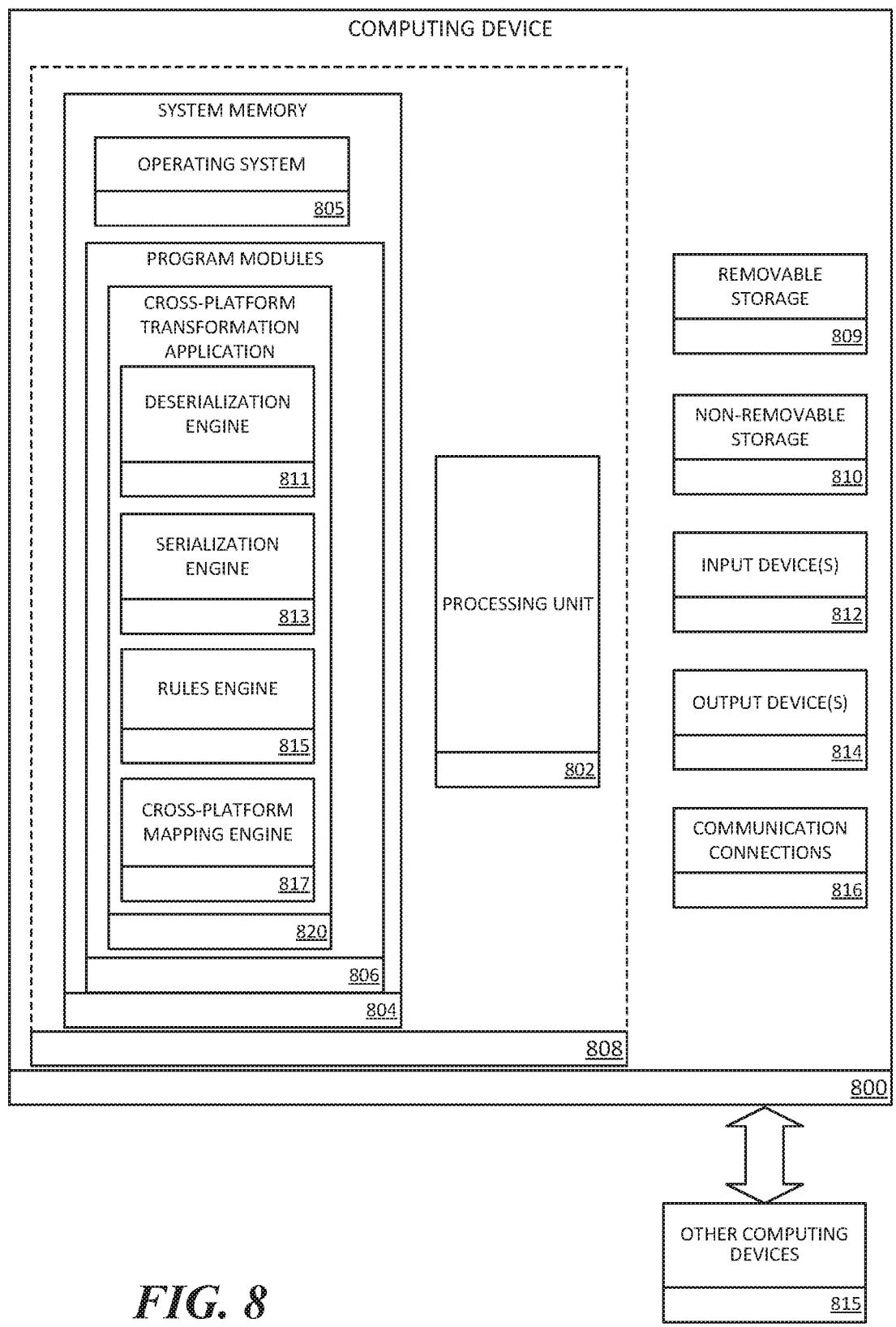
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for providing a consistent cross-platform user experience. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more cross-platform transformation programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., cross-platform transformation application 820) may perform processes including, but not limited to, the aspects, as described herein. According to examples, deserialization engine 811 may perform one or more operations associated with deserializing information associated with a modification of a user experience element on a first device translated for modification on a second device. Serialization engine 813 may perform one or more operations associated with serializing information associated with modification of a user experience element on a first device translated for modification on a second device. Rules engine 815 may perform one or more operations associated with applying rules for a cross-platform transformation service to one or more associated devices in the mapping of user experience modifications made on one of those associated devices to one or more other ones of those devices. Cross-platform mapping engine 817 may perform one or more operations associated with determining whether one-to-one mappings of user experience modifications can be made between devices, and if not, what similar modifications can be made between those devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
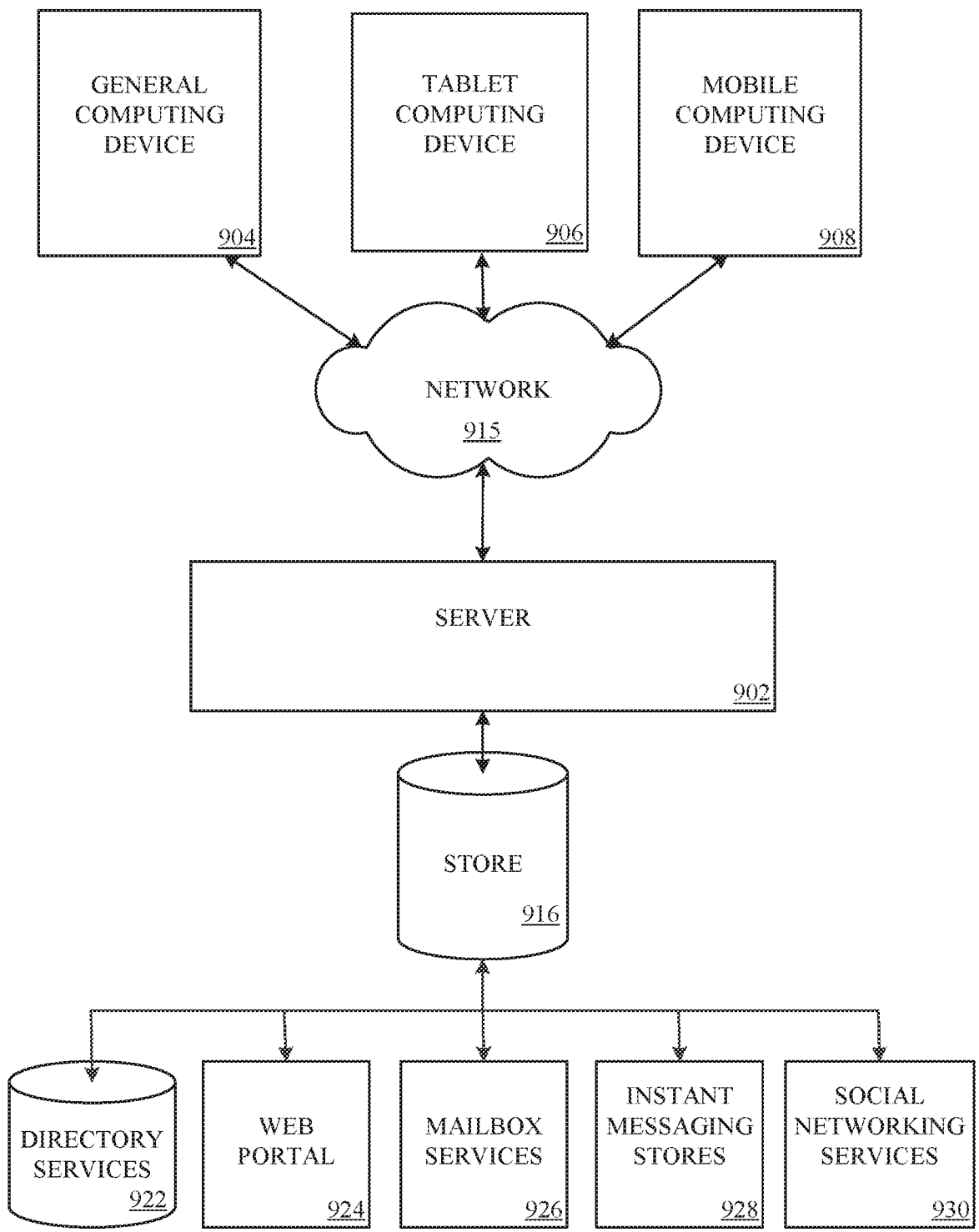
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for providing a consistent cross-platform experience, the computer-implemented method comprising:
   maintaining a mapping component for mapping a plurality of personalized user experience elements for a first computing device and a second computing device, wherein the first computing device operates on a first hardware configuration having first display capabilities, and the second computing device operates on a second hardware configuration having second display capabilities;
   identifying a personalization state of each of the plurality of personalized user experience elements on the second computing device;
   comparing the identified personalization state of each of the plurality of personalized user experience elements from the second computing device to a personalization state of each corresponding one of a plurality of user experience elements on the first computing device;
   determining, based on the comparison, that a displayable user experience element on the second computing device has been modified from a first user experience element to a second user experience element in a first format;
   determining that the second user experience element cannot be displayed in the first format by the first computing device;
   causing the second user experience element to be transformed from the first format to a second format that can be displayed by the first computing device; and
   causing, based on the determination that the displayable user experience element on the second computing device has been modified, a user experience element on the first computing device to be automatically modified to the second user experience element in the second format.

2. The computer-implemented method of claim 1, further comprising:
   determining that a direct connection between the first computing device and the second computing device is not available; and
   causing, based on the determination that the direction connection is not available, the personalization state of each of the plurality of personalized user experience elements on the second computing device to be uploaded to a cloud-based service.

3. The computer-implemented method of claim 2, wherein the cloud-based service comprises a cross-platform transformation service.

4. The computer-implemented method of claim 2, wherein the cloud-based service comprises the mapping component.

5. The computer-implemented method of claim 1, wherein the first computing device executes a first operating system and the second computing device operates a second operating system.

6. The computer-implemented method of claim 1, wherein the first computing device executes a first operating system version and the second computing device executes a second operating system version.

7. The computer-implemented method of claim 1, wherein the displayable user experience element comprises a wallpaper.

8. The computer-implemented method of claim 7, wherein causing the second user experience element to be transformed from the first format to the second format comprises reducing a size of an image corresponding to the wallpaper.

9. The computer-implemented method of claim 7, wherein causing the second user experience element to be transformed from the first format to the second format comprises increasing a size of an image corresponding to the wallpaper.

10. The computer-implemented method of claim 1, wherein the identification of the personalization state of each of the plurality of personalized user experience elements on the second computing device is based on remote access, by the first computing device, to a saved state of each of the plurality of user experience elements for the second computing device.

11. The computer-implemented method of claim 1, wherein the user experience element on the first computing device is modified to the second user experience element in the second format based on a personalized user experience conflict resolution rule dictating that a user experience element conform to a most recently modified state for the user experience element.

12. The computer-implemented method of claim 1, wherein the user experience element on the first computing device is modified to the second user experience element in the second format based on a personalized user experience conflict resolution rule dictating that a user experience element conform to a state of the user experience element for a computing device that was most recently used.

13. A system for providing a consistent cross-platform experience, comprising:
   a memory for storing executable program code; and
   a processor, functionally coupled to the memory, the processor being responsive to computer-executable instructions contained in the executable program code and operative to:
   maintain a mapping component for mapping a plurality of user experience elements for a first computing device and a second computing device, wherein the first computing device operates on a first hardware configuration having first display capabilities, and the second computing device operates on a second hardware configuration having second display capabilities;
   identify a personalization state of each of the plurality of personalized user experience elements on the second computing device;
   compare the identified personalization state of each of the plurality of personalized user experience elements from the second computing device to a personalization state of each corresponding one of a plurality of user experience elements on the first computing device;

determine, based on the comparison, that a displayable user experience element on the second computing device has been modified from a first user experience element to a second user experience element in a first format;

determine that the second user experience element cannot be displayed in the first format by the first computing device;

cause the second user experience element to be transformed from the first format to a second format that can be displayed by the first computing device; and cause, based on the determination that the displayable user experience element on the second computing device has been modified, a user experience element on the first computing device to be automatically modified to the second user experience element in the second format.

14. The system of claim 13, wherein the processor is further responsive to the computer-executable instructions contained in the program code and operative to:

determine that a direct connection between the first computing device and the second computing device is not available; and cause, based on the determination that the direct connection is not available, the personalization state of each of the plurality of personalized user experience elements on the second computing device to be uploaded to a cloud-based service.

15. A computer-readable storage device comprising executable instructions that, when executed by a processor, assist with providing a consistent cross-platform experience, the computer-readable storage device including instructions executable by the processor for:

maintaining a mapping component for mapping a plurality of personalized user experience elements for a first computing device and a second computing device, wherein the first computing device operates on a first hardware configuration having first display capabilities, and the second computing device operates on a second hardware configuration having second display capabilities;

identifying a personalization state of each of the plurality of personalized user experience elements on the second computing device;

comparing the identified personalization state of each of the plurality of personalized user experience elements from the second computing device to a personalization state of each corresponding one of a plurality of user experience elements on the first computing device;

determining, based on the comparison, that a displayable user experience element on the second computing device has been modified from a first user experience element to a second user experience element in a first format;

determining that the second user experience element cannot be displayed in the first format by the first computing device;

causing the second user experience element to be transformed from the first format to a second format that can be displayed by the first computing device; and causing, based on the determination that the displayable user experience element on the second computing device has been modified, a user experience element on the first computing device to be automatically modified to the second user experience element in the second format.

16. The computer-readable storage device of claim 15, wherein the instructions are further executable by the processor for:

determining that a direct connection between the first computing device and the second computing device is not available; and causing, based on the determination that the direct connection is not available, the personalization state of each of the personalized user experience elements on the second computing device to be uploaded to a cloud-based service.

17. The computer-readable storage device of claim 16, wherein the cloud-based serve comprises the mapping component.

18. The computer-readable storage device of claim 15, wherein in causing the second user experience element to be transformed, the instructions are further executable by the processor for:

increasing or reducing a size of an image corresponding to the user experience element.

19. The computer-readable storage device of claim 15, wherein the user experience element on the first computing device is modified to the second user experience element in the second format based on a personalized user experience conflict resolution rule dictating that a user experience element conform to a most recently modified state for the user experience element.

20. The computer-readable storage device of claim 15, wherein the user experience element on the first computing device is modified to the second user experience element in the second format based on a personalized user experience conflict resolution rule dictating that a user experience element conform to a state of the user experience element for a computing device that was most recently used.

* * * * *